United States Patent

[11] 3,560,633

[72] Inventor Jack Shapiro
5 Lynn Drive, Englewood Cliffs, N.J. 07632

[21] Appl. No. 790,962
[22] Filed Jan. 14, 1969
[45] Patented Feb. 2, 1971

[54] DECODER AND PRINTOUT UNIT FOR DATA TRANSMISSION SYSTEM
10 Claims, 4 Drawing Figs.

[52] U.S. Cl. 178/4, 178/23
[51] Int. Cl. H04l 17/16
[50] Field of Search 178/4, 23, 25, 28

[56] References Cited
UNITED STATES PATENTS

| | | | |
|---|---|---|---|
| 2,589,131 | 3/1952 | Potts | 178/4 |
| 3,359,366 | 12/1967 | Magleby | 178/4X |
| 3,363,238 | 1/1968 | Clark et al. | 178/23X |

*Primary Examiner*—Kathleen H. Claffy
*Assistant Examiner*—Charles W. Jirauch
*Attorney*—Max L. Libman

ABSTRACT: A device to accept multitone data signals from a data transmission source, such as a telephone line, decode said signals by means of filters combined with a matrix of gate circuits to produce a decoded output signal for the various combinations of the tones employed, said gate output signals being fed to a synchronizing commutator to fire printing solenoid circuits at the instant when the corresponding data character is in proper position on a printing wheel. Certain of the gate signals denote data characters and others control functions of line spacing, end of message, etc.

INVENTOR
Jack Shapiro
BY
Max L. Libman
ATTORNEY

PATENTED FEB 2 1971

3,560,633

INVENTOR

Jack Shapiro

BY

Max L. Libman

ATTORNEY

DECODER AND PRINTOUT UNIT FOR DATA TRANSMISSION SYSTEM

BACKGROUND OF INVENTION

Present equipment is available for receiving coded data signals on a telephone line, in the form of simultaneously transmitted pairs of tone pulses of several frequencies, wherein each combination of two frequencies represents a particular character, number or order. The receiving equipment is required to decode the incoming signals and print the corresponding character or execute the corresponding order. However, the present equipment is complicated and expensive. It is a major object of the present invention to provide a relatively simple and inexpensive receiving equipment of this type, which can be used by technically inexperienced personnel. It is capable of operating for long periods of unattended service with a high degree of reliability, due to the small number of components and minimum of mechanical complexity.

SUMMARY OF INVENTION

Date signals from telephone line or other data transmission sources are fed into a line amplifier to increase the signal to a required level, and to hold it at that level by automatic gain control of the amplifier. The multitone data signal output of the amplifier is then fed into an array of filters, each for one of the tones employed for the particular data transmission system. In the preferred system, two simultaneous tones indicate a particular character or function, and a total of eight tones is employed, the filter outputs being then fed to a gate matrix such that each combination of the eight primary tones is fed into a separate circuit which produces an output signal when and only when the outputs from its two associated filters are simultaneously fed into it. The gate output signals are then fed to individual segments of a stationary commutator, which correspond to the individual characters on a printing wheel, identified by the particular pair of tones.

The printing wheel is mounted on a motor driven shaft, and preferably rotates with it. A shorting brush is mounted on a disc of insulating material, which is fastened to the shaft. The shorting brush successively connects a ring segment of the insulated disc with a number of circularly spaced contacts connected to respective leads for conducting the gate output signals. The ring segment is connected to a firing circuit which actuates the printing solenoid at the instant when the character on the printing wheel is in proper position. The gate signal which orders the actuation of the firing circuit is stored as a condenser charge in the gate output until the print wheel is in proper position, as synchronized by the commutator.

The print wheel is slidably mounted on a rotating shaft and keyed thereto, and is advanced one letter space each time the print solenoid is actuated. Printing is done on the forward stroke of the solenoid, while the printing wheel is advanced on the return stroke by means of step-and-hold pawls. At the end of a line, a special signal actuates the carriage return solenoid, through circuitry similar to that employed for the printing solenoid, which releases the pawls, permitting spring return of the carriage to the line start position, and advancing the paper by one line space.

In typical operation for equipment of this type, multitone telephone signals are commonly used as in the pushbutton type of telephone-dialing system. This enables the transmission of data over telephone lines and the printing out of such data in the form of hard copy at the receiving station.

DESCRIPTION OF THE FIGURES

Figures 1, 4:
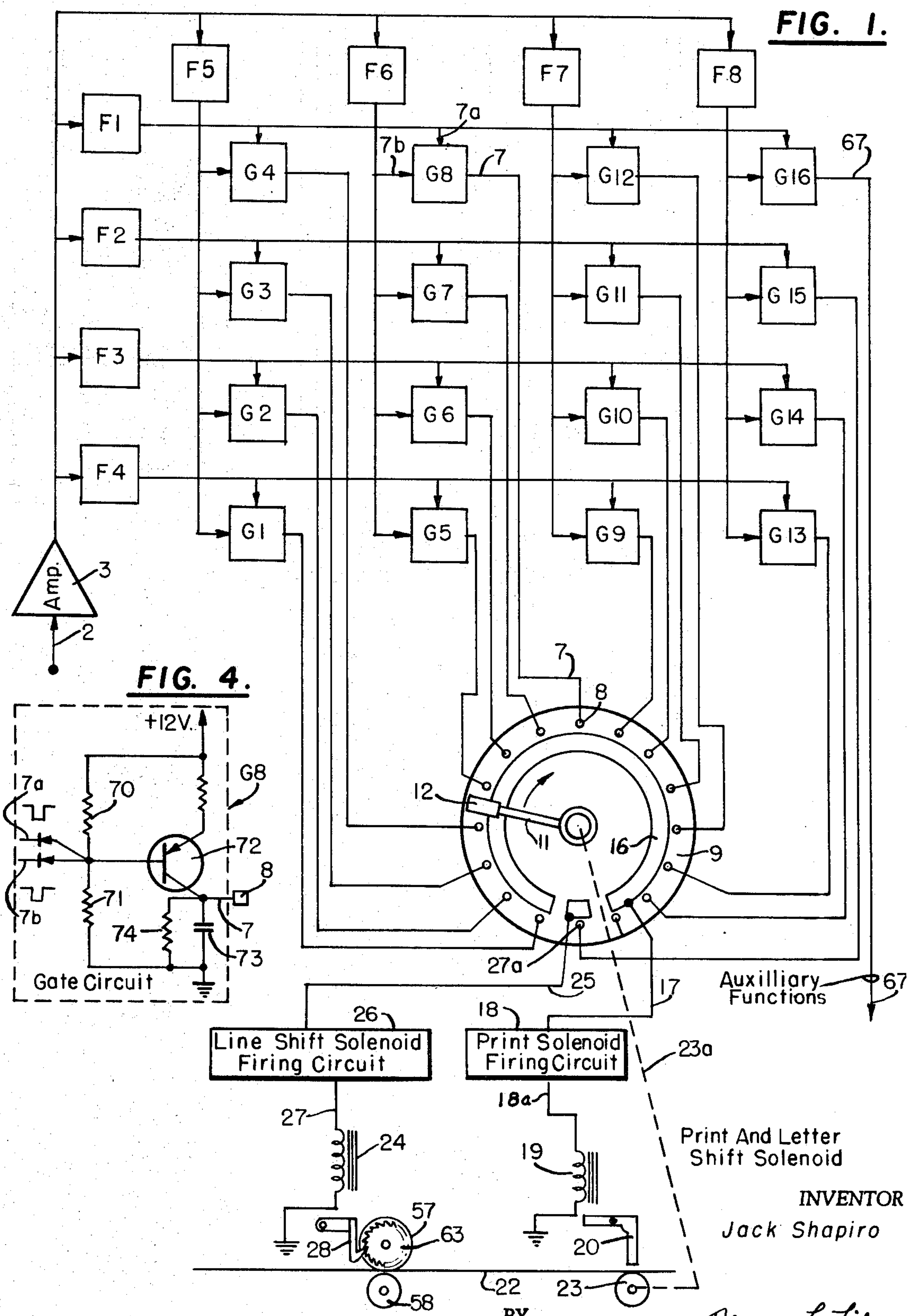
FIG. 1 is a highly schematic diagram showing the signal selecting circuits and their circuit relationship to the printing and paper advance equipment.
FIG. 4 is a schematic circuit diagram of a typical gate output circuit for storing the gate signal until the print wheel is in the proper position.

Referring to FIG. 1, the incoming signals arrive on line 2, from various data sources. These signals, in the present example, are in the form of pairs of tones selected from an available group of eight different tone signals, i.e., eight signals of different frequency, any two of which are simultaneously transmitted on line 2, so that there are 16 possible signal combinations available on the line the form of brief bursts of groups of two of the selected frequencies. These signals are therefore similar to those used in the present touch-tone telephone system, which employs eight tones in combinations of two to provide a total of 16 characters. It will be apparent that a system requiring a greater number of characters such as an alpha-numeric data transmission system would require the use of a greater number of tones, or combinations of more than two tones.

The tone signals on line 2 are amplified in conventional manner as indicated by amplifier 3, and the amplified signal is transmitted to the inputs of a group of eight filters F-1 to F-8, which will block all of the signals except the two corresponding to the input signal being received at that instant; therefore only two of the filters will have an output. A matrix 6 consisting of 16 AND gates G-1 to G-16 is provided for possible combinations. Assuming, for example, that the incoming signal at the instant under consideration has two frequencies corresponding to the filters F-1 and F-6, it will be seen from the circuit diagram that the outputs from these two filters will appear simultaneously only at gate G-8, and therefore only gate G-8 will emit a signal, which will appear on its output line 7, which in turn is connected to contact 8 of a stationary contact disc 9 having 16 contacts, each of which may be connected to one of the 16 gates. Rotating arm 11 carries bridging contact 12 which bridges circular conductive strip 16 and the successive contacts on disc 9, whereby the signal is transmitted from line 7 to strip 16, and thence on line 17 through firing circuit 18 which energizes solenoid 19 to actuate a printing hammer 20 against the face side of web 22 which may be a paper roll or made of any other suitable material for receiving printed characters. On the face side of the print strip 22 is a printing wheel 23 which is rotating in synchronism with arm 11, as indicated by dash line **23*a*** and which may bear the characters to be printed in the form of raised type characters upon its surface, so that the character which is printed corresponds to the position of the arm at the time the firing circuit is energized, which in turn corresponds to the particular terminal which is actuated by the incoming signals as described above.

Figures 2, 3:
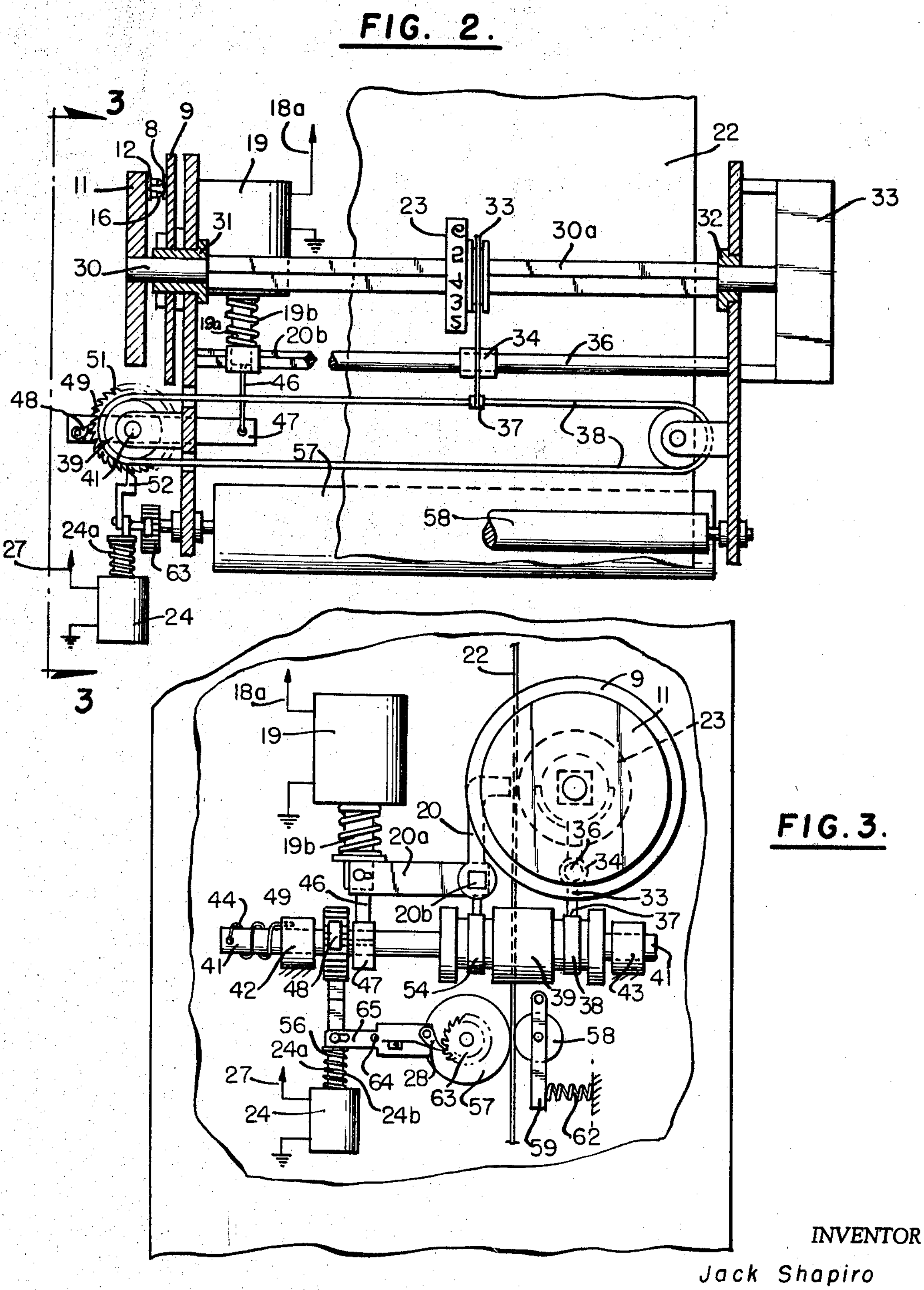
FIG. 2 is a front view and FIG. 3 a side view of a schematic showing of tp typical mechanism for printing and paper moving.

It will be apparent that after a character has been printed, the print wheel 23 and hammer 20 must be moved laterally for the usual situation where it is desired to print a horizontal row of characters, and a shift arrangement must therefore be provided (as shown in FIGS. 2 and 3) for the printing hammer 20 and print wheel 23, unless a multiple print wheel is used which has a separate row of characters for each horizontal position of the printed line, which is also possible but more expensive. A printer return and line shift mechanism actuated by solenoid 24 is also shown in FIGS. 2 and 3, which show one form of print mechanism. The incoming signal on line **18*a* from the print solenoid firing circuit 18 actuates solenoid 19, moving its armature 19*a* upwardly against the compression of spring 19*b*, and carries with it link 20*a* which is fixed to square shaft 20*b* on which hammer 20 is slidably keyed, so that this upward motion of the armature causes the hammer to strike paper 22 against print wheel 23, which at that time has presented to the paper the appropriate letter, determined by the angular position of the print wheel, which is in turn synchronized with the angular position of the rotating arm 11 as described above. For this purpose, rotating arm 11, best shown in FIG. 2, is mounted on shaft 30 for rotation therewith. The shaft rotates within fixed bearings 31 and 32, and is driven continuously during the operation of the device by electric motor 33. Disc 9 is stationary, and may be fixed to the hub or bearing 31, so that as arm 11 rotates, bridging element 12 engages the contacts such as 8 with the arcuate sector 16, as described above. The central portion of the shaft 30 is square, as shown at 30***a*, so that print wheel 23 can slide on this portion of the shaft to assume successive printing positions, for which purpose it is moved by a yoke 33 which is slidably supported through hub 34 on round rod 36, and is fixed at 37 to a pulley cable 38 which is driven from drum 39 fixed to a shaft 41 and rotatable in fixed bearings 42, 43. A torsion spring 44 is fastened to shaft 41 and at the other end to a fixed point such as bearing 42, so that as the shaft is rotated, the spring is wound up to enable a quick return when the end of a print line is reached, as will be described below.

As shown above, energization of print solenoid 19 causes the printing of a character by print hammer 20, and at the same time compresses spring 19*b*. Immediately thereafter, line 18*a* is deenergized, as arm 11 moves away from contact 8, and upon deenergization, spring 19*b* moves the armature down to its initial position, carrying with it link 46, which actuates lever 47 which is pivoted on shaft 41, and carries pawl 48 upward to engage one of the ratchet teeth 49 of a ratchet wheel 51 which is fixed to shaft 41, and therefore drives the shaft, and thus through drum 39 drives belt 38 a sufficient distance so that yoke 33 carries print wheel 23 a distance sufficient to print the next letter of the line which is then being printed. The pawl 48 is so arranged that at the end of its stroke it clears the ratchet teeth 49, but a second ratchet pawl 52 has in the meantime engaged another ratchet tooth to hold the drum in the new position against the torsion of spring 44. Drum 39 is provided with a second pulley belt 54 similar to belt 38, and this second belt is attached to hammer position, which is slidable on its square shaft 20*b*, so that the hammer is moved simultaneously with the print wheel to retain the same relative position opposite to the print wheel in each position of the print wheel on its square shaft 38. Thus the print wheel 23 and printing hammer 20 are moved simultaneously after each letter has been printed into position for the next letter.

This operation proceeds until the end of a line has been reached, at which time a line shift signal is sent to the equipment which is a signal coded to pass through gate G-15 onto line 27. When are 11 reaches the proper position to engaged contact 27*a*, bridge 12 connects this contact to line 25 and a signal is emitted through the solenoid firing circuit 26 onto line 27 to energize line-space solenoid 24 which draws its armature 24*a* down against the compression of spring 56. This releases hold pawl 52 from engagement with the ratchet wheel 51, and since step pawl 48 is at this time also out of engagement with the ratchet wheel, torsion spring 44 returns the drum to the starting position on the line, thus carrying print wheel 23 and hammer 20 back to the starting line position. It is also necessary at this time to move the paper 22 to the next line position. The paper is held between rollers 57 and 58, the latter being mounted on arm 59 pivoted at point 61 and urged by spring 62 into engagement with roller 57 to hold the paper between the two rollers. Roller 58 may be manually moved to the right, as as seen in FIG. 3, against the compression of spring 62 for the removal or insertion of an additional sheet or sheetpack of paper 22. A small ratchet wheel 63 is fixed to the end of roller 57, and is operated by pawl 28 when link 65 is pivotally moved about its pivot point 64 at the time the armature returns. Thus energization of armature 24 releases pawl 52 to permit return of the printing mechanism to the line start position. and also shifts the paper into position for a new line of printing, on the return stroke of the armature.

FIG. 4 represents a typical gate circuit (e.g. gate G-8) which accepts signals from the related filter circuits in the form of negative-going pulses. Resistors 70 and 71 form a voltage divider which holds the base of transistor 72 at a voltage approximately the same as the emitter itself holding the transistor cutoff. A single negative-going pulse on either line 7*a* or 7*b* will cause current to flow in resistor 70, dropping the voltage on the base to a point which is insufficient to cause transistor 72 to conduct, but when simultaneous pulses arrive on lines 7*a* and 7*b*, the current drain caused thereby through resistor 70 will drop the voltage on the base of transistor 72 sufficiently to cause emitter-collector current to flow into capacitor 73. This charges the capacitor, and the charge is then held by the capacitor, which is connected to segment 8 (for gate G-8). Resistor 74 serves as a leakage path across capacitor 73 so as to remove the charge over a relatively lone period of time, corresponding to one or two rotations of the brush around the commutator. The charge on capacitor 73 is carried into the firing circuit 18 by the rotating brush 11 when it reaches segment 8, in the present example, or any other segment which is charged during a particular cycle of rotation of arm 11. Resistor 74 serves primarily to leak off spurious or accumulated charges on capacitor 73 which are not completely discharged by the firing circuit. The capacitor serves to store the information during that part of the rotation of the brush when it is out of contact with the segment corresponding to the input signal received during that cycle.

Filters F-1 to F-8 include a rectifying and time constant circuit which converts the input signal into a pulse of the width required to actuate the gate circuit. This type of circuitry is well known, and it is apparent that any other known type of AND gate could also be employed instead of the preferred embodiment shown in FIG. 4.

It is, of course, necessary to provide a print wheel with some method of inking, in order to provide printed characters, or alternatively, carbon paper may be employed, but these details are well understood in the art, and are within the skill of any competent designer.

By employing modern techniques and components, such as active filters instead of passive filters, and printed circuit techniques, both for the circuit elements and for the commutator, the present invention provides a highly economical, low-cost unit of great reliability.

It will thus be apparent from the above description that by the proper transmission of signals on line 2, any one of the gates G-1 to G-16 can be energized to either print any desired letter in a line of printing, or else to bring the print carriage mechanism back to its initial starting position opposite a new line to be printed. In addition, one or more gates may be reserved, as shown for gate G-16 and line 67, for any desired auxiliary functions such as shutting off power to the printing equipment, or any desired part thereof.

It will be understood that the invention is not limited to the exact embodiment shown and that various modifications can be made in construction and arrangement within the scope of the invention.

I claim:

1. a. Decoder and printout unit for a data transmission source providing input signals representing individual characters and orders, comprising:

b. signal separation means providing an output signal on a separate line for each input signal representing an individual character or order;

c. means for connecting each said separate line to one of a set of individual contacts;

d. a firing circuit and commutating means continuously operable for successively and cyclically connecting each of said individual contacts representing characters to said firing circuit, each cycle of operation of said commutating means corresponding in time to the transmission cycle time for the transmission of a character or order from the transmission source;

e. a print unit comprising a print wheel bearing individual characters to be printed, and a print hammer slidable mounted for printing a line of characters on a sheet positioned between said wheel and said hammer;

f. means for continuously rotating said print wheel in synchronism with said commutating means; and g. actuating means for operating said print hammer, said actuating means controlled by said firing circuit to operate said hammer to strike a character on the print wheel at a time during the rotation of said print wheel determined by the one of said individual contacts which is connected to said separate line during each cycle of operation.

2. The invention according to claim 1, (h) said data transmission source being a telephone line.

3. The invention according to claim 2, (i) said input signals each comprising two different tone frequencies simultaneously transmitted, said filter AND-gate matrix including AND-gate means respectively responsive to predetermined combinations of said simultaneously transmitted input frequencies to respectively provide said output signals.

4. The invention according to claim 2, (i) and stepping means operated by said actuating means of section (g) to slidably step said print unit to a new print position for printing the next character.

5. The invention according to claim 4, (j) said actuating means for said print hammer being electromagnetic means actuated by said firing circuit, and said stepping means being ratchet means connected to said electromagnetic means.

6. The invention according to claim 2, (i) said individual contacts being arranged along the circumference of a circle, an arcuate conducting strip on said disc concentric with the array of said contacts representing characters and radially disposed therefrom, brush means being a conductive bridge element for successively connecting said contacts to said arcuate strip, said strip being connected with said firing circuit.

7. The invention according to claim 4, (j) and return and line space reset means for returning said print unit to a line start position and advancing a sheet being printed to next line position, said reset means being operated by electromagnetic means controlled by an incoming order signal.

8. The invention according to claim 7, (k) said return means including return spring means for said print unit and including pawl means so operable step-by-step with said stepping means to retain the print unit in each stepped position against the force of said spring means, and pawl release means operable by said reset means to return the printing unit to line start position.

9. The invention according to claim 8, (l) including line stepping means operable by said electromagnetic means of claim 7 to advance the sheet being printed to next line position.

10 The invention according to claim 1, (h) said input signals representing individual characters and orders by selected input frequencies of a set of available frequencies, and said signal separation means comprising a filter AND-gate matrix for separating out the available frequencies and converting them to said output signals.